(12) United States Patent
O'Dell et al.

(10) Patent No.: US 11,340,911 B2
(45) Date of Patent: May 24, 2022

(54) INSTALLING PATCHES USING A JAIL

(71) Applicant: EMC IP Holding Company LLC, Hopkinton, MA (US)

(72) Inventors: Jared O'Dell, Tacoma, WA (US); Douglas Kilpatrick, Seattle, WA (US); Gene W. Lee, Seattle, WA (US); Sophia Anderson, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 195 days.

(21) Appl. No.: 16/744,591

(22) Filed: Jan. 16, 2020

(65) Prior Publication Data
US 2021/0224074 A1 Jul. 22, 2021

(51) Int. Cl.
| | |
|---|---|
| *G06F 8/65* | (2018.01) |
| *G06F 1/24* | (2006.01) |
| *G06F 11/14* | (2006.01) |
| *G06F 9/4401* | (2018.01) |
| *G06F 21/53* | (2013.01) |
| *G06F 21/57* | (2013.01) |
| *G06F 3/06* | (2006.01) |
| *G06F 9/44* | (2018.01) |

(52) U.S. Cl.
CPC ............... *G06F 9/441* (2013.01); *G06F 1/24* (2013.01); *G06F 3/067* (2013.01); *G06F 3/0607* (2013.01); *G06F 3/0644* (2013.01); *G06F 8/65* (2013.01); *G06F 9/4416* (2013.01); *G06F 11/1451* (2013.01); *G06F 11/1469* (2013.01); *G06F 21/53* (2013.01); *G06F 21/575* (2013.01)

(58) Field of Classification Search
CPC .......... G06F 9/441; G06F 9/4416; G06F 8/65; G06F 21/53; G06F 21/575; G06F 3/067; G06F 11/1451; G06F 11/1469; G06F 3/0644; G06F 3/0607; G06F 1/24; G06F 2221/2149
USPC ................................................ 713/1, 2, 100
See application file for complete search history.

(56) References Cited

U.S. PATENT DOCUMENTS

2007/0244941 A1* 10/2007 Reed .................... G06F 11/1433

* cited by examiner

*Primary Examiner* — Michael J Brown
(74) *Attorney, Agent, or Firm* — Amin, Turocy & Watson, LLP

(57) ABSTRACT

Techniques are provided for installing patches using a jail. In an example, a computing node boots from a first partition and then mounts a second partition. The computing node can install an upgrade image for an operating system on the second partition. The computing node can then create a jail that sets the mount point of the second partition as the apparent root directory, and install one or more patches within the jail. The computing node can then reboot from the patched and upgraded operating system of the second partition. In this manner, the node can be upgraded with an operating system and one or more patches, while being rebooted once.

20 Claims, 10 Drawing Sheets

300

INSTALLING PATCHES USING A JAIL

TECHNICAL FIELD

The present application relates generally to upgrading nodes of a computing cluster, where upgrading the nodes comprises installing one or more patches.

BACKGROUND

In some examples, a computing cluster can comprise a plurality of computers, referred to as "nodes" or "computing nodes," that can work in concert such that they can be viewed as a single system—the computing cluster. In some examples, a computing cluster can be utilized to implement a distributed file system that organizes a plurality of file shares that are distributed across multiple computing nodes of a computer system. A distributed file system can offer a single namespace across the multiple nodes of the computer system and that can be accessed by a computer that has established a remote session with the distributed file system. A distributed file system can also offer data redundancy via, for example, replicating a file across multiple computing nodes of a computing cluster.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
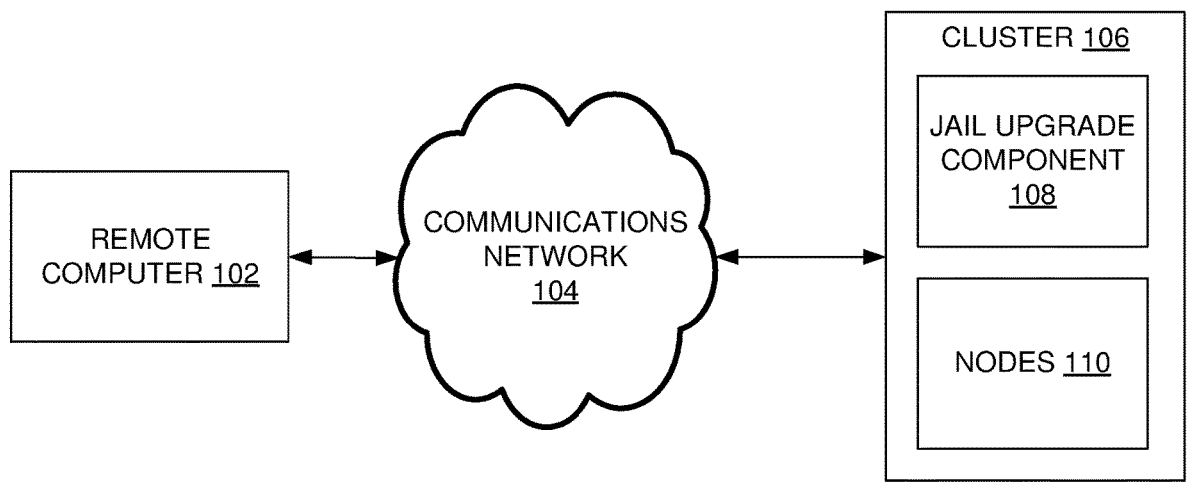
FIG. 1 illustrates a block diagram of an example computer system that can facilitate installing patches using a jail, in accordance with certain embodiments of this disclosure.

Some software patches to a system require a reboot to be applied to the system. When applying these patches to a system that is being upgraded, the system can need to be rebooted twice. In such examples, the first reboot can be to boot into the new operating system version, and the second reboot is to apply the patch. In examples where the present techniques are implemented, an operating system upgrade and a patch installation can be implemented with a single reboot. In such examples, the patch can be installed in a jail, where the jail's root is the partition that is being configured with the new operating system version.

Some operating systems can use backup firmware image partitions (which can be known as "Last Known Good" or "LKG" partitions). An backup firmware image partition generally can comprise a file system partition that contains a known valid operating system configuration for the first computing node, and/or a file system partition that is booted from in response to a computing node failing to boot from another partition that is set as the boot partition. A boot partition generally can comprise a partition that a computing node attempts to boot from.

An example of an operating system that can use a backup firmware image partition is a OneFS™ operating system that runs on an Isilon™ computing node. In using backup firmware image partitions, an operating system can use two partitions—a boot partition (a partition that the operating system is currently running on), and then a backup firmware image partition (a partition that can be used for upgrading, and that can contain a new operating system during an upgrade process).

During an upgrade, a backup firmware image partition can be mounted and provisioned with the new operating system, and then the system can swap the backup firmware image partition and the boot partition. That is, after the swap, when the system is rebooted, the system will reboot using the operating system stored on what was the backup firmware image partition. Put another way, what was the backup firmware image partition will become the new boot partition, and what was the boot partition will become the new backup firmware image partition. During a future operating system upgrade, the upgrade can be made to the new backup firmware image partition, which can then be swapped with the new boot partition, repeating the above process.

This approach can utilize a backup firmware image partition that is being provisioned for a new operating system version during an upgrade, but before the system is switched to the new partition, and booted up using the new partition. In prior approaches, an upgrade with patches could be implemented as follows: the backup firmware image partition is mounted. The upgrade image is unpacked with the new operating system version in the backup firmware image partition. The node's configuration is migrated from the boot partition to the backup firmware image partition. The boot partition and the backup firmware image partition are swapped (i.e., what was the boot partition is the new backup firmware image partition, and what was the backup firmware image partition is the new boot partition). The node is rebooted to start running the new operating system version on the new boot partition. Patches are installed on the new boot partition using patch installation. The node is rebooted again, if a reboot is indicated by the patches that are installed. This approach can then be repeated on additional nodes that are to be upgraded.

In an upgrade according to the present techniques, a jail (such as a jail in a FreeBSD™ operating system, or a chroot jail) can be utilized to fully install the patch before the system reboots. A jail generally can comprise an environment with an apparent root directory for a particular computer process that is different from the actual root directory for the computing node upon which the computer process executes. In some examples, an instance of a jail can be created with a chroot command on a UNIX-type operating system.

This approach can allow a single reboot to fully apply both the new operating system version, and any patches that are to be installed. An approach utilizing the present techniques can be implemented as follows:

The backup firmware image partition can be mounted. The upgrade image can be unpacked with the new operating system version in the backup firmware image partition. The node's configuration can be migrated from the boot partition to the backup firmware image partition. A jail can be created using the backup firmware image partition as the root partition in the jail. Inside the jail, a patch installation process can be run to install one or more patches. The boot partition can be swapped with the backup firmware image partition, so that the boot partition becomes the new backup firmware image partition, and the backup firmware image partition becomes the new boot partition. The node can be rebooted to start running the new operating system version with the patches already applied. This approach can then be repeated on additional nodes that are to be upgraded.

A jail can typically be used to limit how much of a file system that a process is permitted to access. With the present techniques, the jail can be utilized to simulate running a new operating system version in a way that is valid enough to run a normal patch system and patch scripts in the jail, without waiting for the node to reboot first. Additionally, should the operating system have security flaws that are being corrected via a patch that is being installed, those corrections can be made before the system is able to execute operating system code that contains those security flaws. It can be that those corrections can be made before the system is able to execute operating system code that contains those security flaws because the patch system software (but not the operating system software with the security flaws) will be running in the jail.

Since the patch system and patch scripts are running directly in the jail, in some examples, they do not need to be modified to apply the patch to a different location for upgrades than for normal operation. This approach can make both the patch system and individual patches simpler, and reduce the need for testing multiple deployment approaches for each patch.

In prior approaches, a node would be upgraded, then rebooted to allow it to run on the new software version, and then only then would a patch be applied. If the patch required a reboot, then the node would need to be rebooted a second time. A node reboot could take a few minutes to complete. A few minutes per reboot multiplied by each node of a 250-node cluster where the nodes are being upgraded serially, this could add nearly 24 hours of time to the upgrade process just to perform a second reboot on each node.

A different approach could be to apply a patch to a node being upgraded by staging the patch files directly on the new partition without going through a full patch installation process. This approach would either not allow patch scripts to be run, or would require special considerations when applying patch scripts to allow them to run against a non-standard location, such as a mount point of a backup firmware image partition. If patch scripts are instead designed to run against a root partition and also a backup firmware image partition, then this would add additional complexity to the script, and require both more work to write the scripts and more work to test the scripts. Not running patch scripts at all could mean that the patch is not fully applied. Creating more complicated patch scripts to run against a backup firmware image partition could add overhead to a patch-creation process. Each of these approaches has drawbacks.

The present techniques can be applied to a system that performs operating system upgrades, and applies the latest software patches at the same time. The present techniques can be useful in scenarios where a second reboot can create an unacceptable amount of overhead, such as with a large clustered system.

Example Architectures

FIG. 1 illustrates a block diagram of an example computer system 100 that can facilitate installing patches using a jail, in accordance with certain embodiments of this disclosure. As depicted, computer system 100 comprises remote computer 102, communications network 104, and computer cluster 106. In turn, computer cluster 106 comprises jail upgrade component 108 and nodes 110. In some examples, jail upgrade component 108 can implement aspects of the process flows of FIGS. 6-9 to facilitate installing patches using a jail. Remote computer 102 and computer cluster 106 are communicatively coupled via communications network 104.

Figure 10:
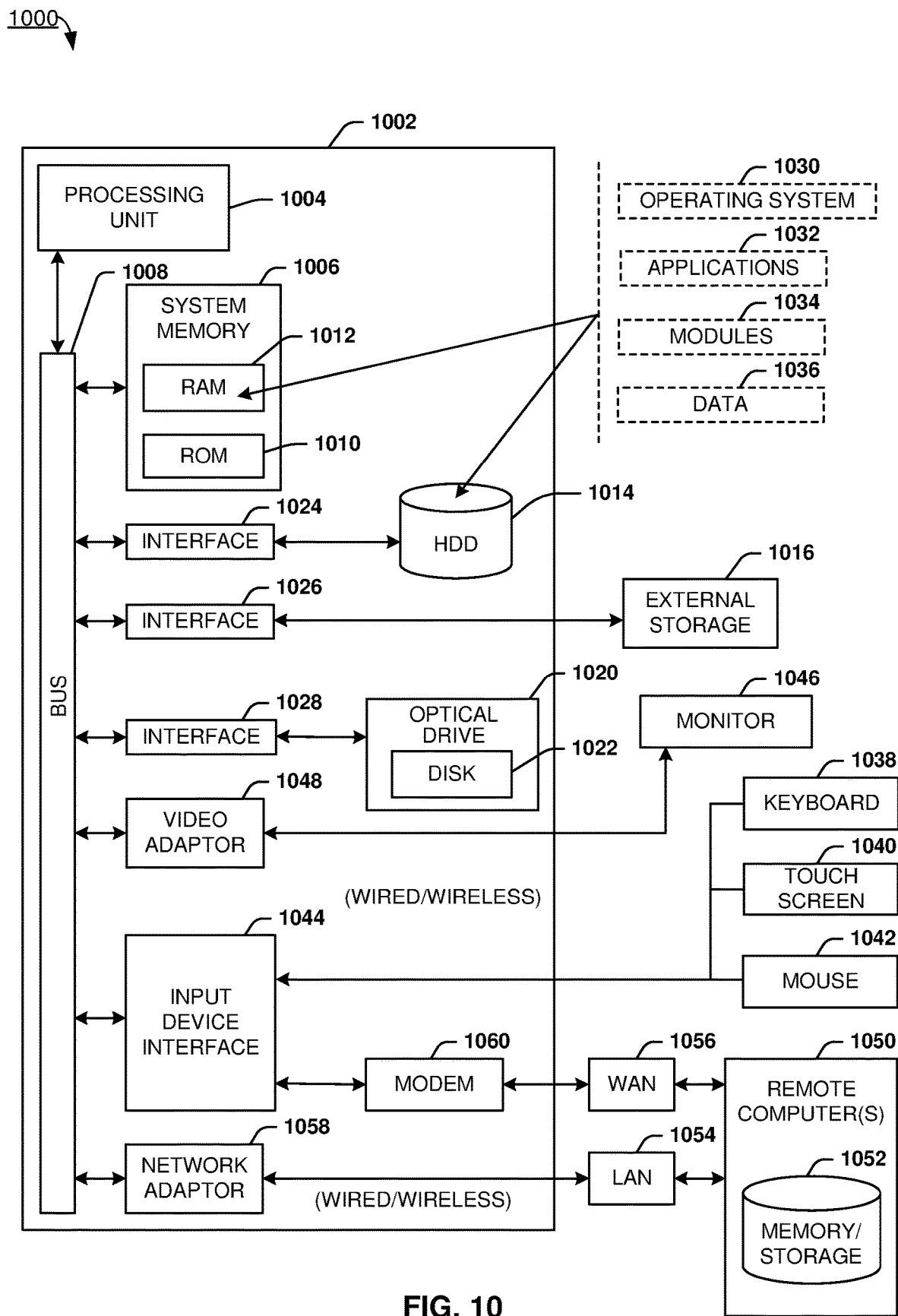
FIG. 10 illustrates an example block diagram of a computer operable to execute certain embodiments of this disclosure.

Each of remote computer 102 and computer cluster 106 can be implemented with aspects of one or more instances of computing environment 1000 of FIG. 10. Communications network 104 can comprise a computer communications network, such as the INTERNET.

Remote computer 102 can indicate to computer cluster 106 that an upgrade is to be performed on one or more nodes of computer cluster 106, and that this upgrade comprises an upgrade image and at least one patch. For example, an administrator of computer cluster 106 can utilize a command-line user interface of remote computer 102 to indicate this. Remote computer 102 can transmit the upgrade image and the one or more patches to computer cluster 106 via communications network 104. In other examples, the upgrade image and/or the one or more patches can already be stored on computer cluster 106.

Computer cluster 106 (in some examples, specifically jail upgrade component 108, which can be a process that executes on computer cluster 106) can receive this information from remote computer 102. In response, computer cluster 106 can determine whether the one or more patches and the upgrade image are compatible with each other. If compatible, computer cluster 106 can register the patches to be installed.

Computer cluster 106 can perform this compatibility check, and registration and storage of the patches at the cluster level—it can be performed once for computer cluster 106, independent of how many nodes are of computer cluster 106 are to be upgraded. Computer cluster 106 can then begin the upgrade process by installing the upgrade image on one or more nodes of nodes 110.

A node of nodes 110 can have two partitions, where each partition can generally be a separate area of computer storage. These two partitions can be referred to as a boot partition and a backup firmware image partition, or more generally, a first partition and a second partition. The node may currently be booted from the first partition, and the upgrade image can be installed on the second partition.

Then, a jail can be created that sets the apparent root directory for the jail to the second partition (e.g., what appears within the jail to be "/" within a file system can be "/volumes/partition2/"). Patches can be applied to the second partition within this jail.

Then, the node can be rebooted one time using the second partition as the root directory. The node can be rebooted once in the process of installing both the upgrade image and one or more patches.

Figure 2:
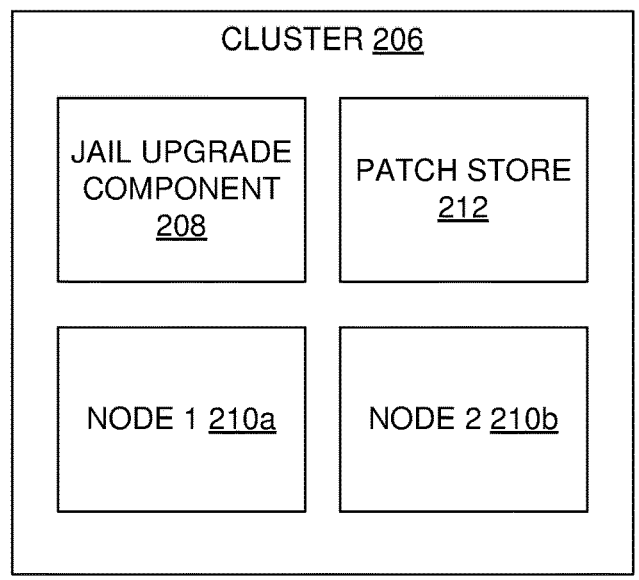
FIG. 2 illustrates another block diagram of an example computer system that can facilitate installing patches using a jail, in accordance with certain embodiments of this disclosure.

FIG. 2 illustrates another block diagram of an example computer system 200 that can facilitate installing patches using a jail, in accordance with certain embodiments of this disclosure. As depicted, computer system 200 comprises computer cluster 206. In turn, computer cluster 206 comprises jail upgrade component 208, node 1 210a, node 2 210b, and patch store 212. In some examples, jail upgrade component 208 can implement aspects of the process flows of FIGS. 6-9 to facilitate installing patches using a jail. Computer cluster 206 can be implemented with aspects of one or more instances of computing environment 1000 of FIG. 10.

In some examples, computer cluster 206 can be similar to cluster 106 of FIG. 1; jail upgrade component 208 can be similar to jail upgrade component 108 of FIG. 1; and node 1 210a and node 2 210b can each be similar to an individual node of nodes 110 of FIG. 1.

Patch store 212 can comprise a region of computer memory in which patches can be received from a remote computer (such as remote computer 102 of FIG. 1) and then stored to be applied during installing patches using a jail. Node 1 210a and node 2 210b can each comprise a computing node that can be upgraded with an upgrade image and one or more patches, using a jail.

Some operations can be performed at the cluster level, such as by jail upgrade component 208. For example, jail upgrade component can evaluate the upgrade images and one or more patches for compatibility. That is, some operations can be performed one time for a computing cluster, regardless of how many nodes the computing cluster comprises.

Other operations can be performed at the node level, such as creating a jail within a node and applying the patches within the jail. That is, in some examples, in contrast to some operations being performed at the cluster level, other operations can be performed once per node, for each node that is being upgraded.

When a computing node e.g. node 1 210a or node 2 210b applies patches within a jail, that node can retrieve the patches from patch store 212.

Figure 3:
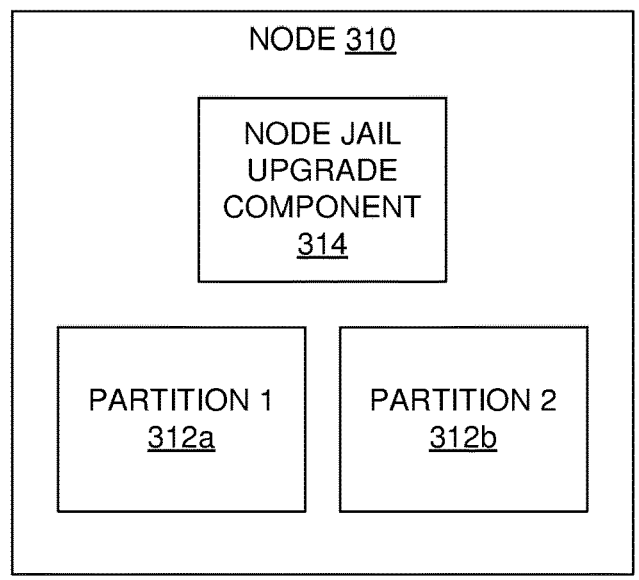
FIG. 3 illustrates another block diagram of an example computer system containing two partitions that can facilitate installing patches using a jail, in accordance with certain embodiments of this disclosure.

FIG. 3 illustrates another block diagram of an example computer system 300 containing two partitions that can facilitate installing patches using a jail, in accordance with certain embodiments of this disclosure. As depicted, computer system 300 comprises node 310. In turn, node 310 comprises partition 1 312a, partition 2 312b, and node jail upgrade component 314. In some examples, node 310 can implement aspects of the process flows of FIGS. 6-9 to facilitate installing patches using a jail. Node 310 can be implemented with aspects of one or more instances of computing environment 1000 of FIG. 10. In some examples, node 310 can be similar to a node of nodes 110 of FIG. 1, or to node 1 210a or node 2 210b of FIG. 2.

Partition 1 312a, partition 2 312b can each comprise a computer storage partition, which can generally comprise a distinct region of a computer hard drive or computer memory. In some examples computing node can boot from a partition where that partition stores an operating system. A computing node can mount a partition that it has not booted from, where mounting a partition can generally comprise making the computer files stored in that partition accessible to the operating system as part of a computer file system.

Using the example of computer system 300, node 310 can boot from partition 1 312a. Then, node 310 (via node jail upgrade component 314, which can comprise a process that node 310 executes) can mount partition 2 312b, and installing patches using a jail on partition 2 312b.

Once installing patches using a jail is performed on partition 2 312b, node 310 can reboot, using partition 2 312b as the boot partition. Then, if node 310 is to perform installing patches using a jail again, the upgrade image and patches can be installed on partition 1 312b (with node 310 being booted from partition 2 312b). In this sense, node 310 can alternate which of the two partitions—partition 1 312a and partition 312b—is used as the boot partition, and which of the two partitions is used as the upgrade partition, with the roles switched each time the upgrade partition is upgraded, and then booted from.

Figure 4:
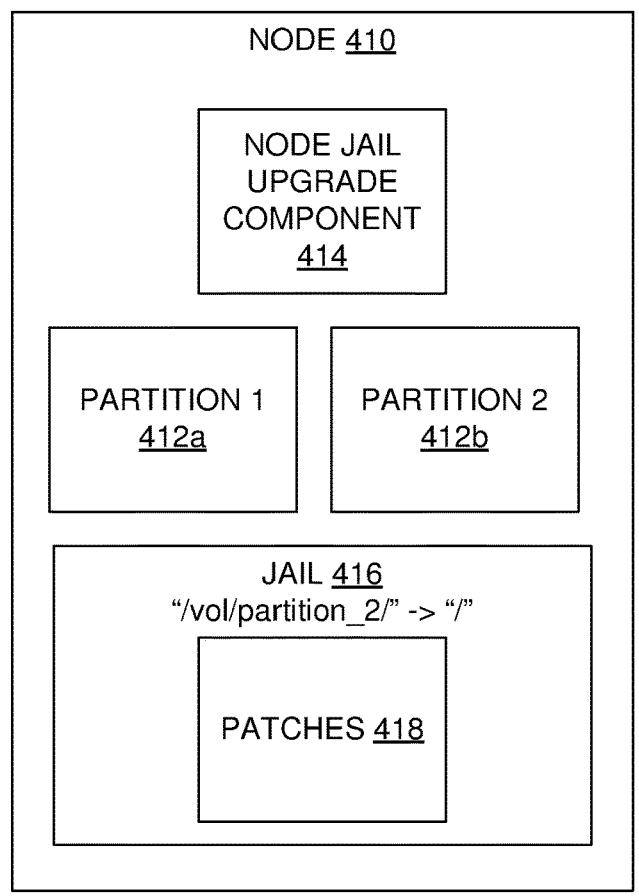
FIG. 4 illustrates another block diagram of an example computer system comprising a jail that can facilitate installing patches using a jail, in accordance with certain embodiments of this disclosure.

FIG. 4 illustrates another block diagram of an example computer system 400 comprising a jail that can facilitate installing patches using a jail, in accordance with certain embodiments of this disclosure. As depicted, computer system 400 comprises node 410. In turn, node 410 comprises partition 1 412a, partition 2 412b, node jail upgrade component 414, jail 416, and patches 418. In some examples, node 410 can implement aspects of the process flows of FIGS. 6-9 to facilitate installing patches using a jail. Node 410 can be implemented with aspects of one or more instances of computing environment 1000 of FIG. 10.

In some examples, node 410 can be similar to a node of nodes 110 of FIG. 1, to node 1 210a or node 2 210b of FIG. 2, or to node 310 of FIG. 3; partition 1 412a and partition 2 412b can be similar to partition 1 312a and partition 2 312a of FIG. 3; and node jail upgrade component 414 can be similar to node jail upgrade component 314 of FIG. 3.

Jail 416 can comprise a jail created by node 410 and within node 410. As depicted, node 410 can have booted from partition 1 412a. Node 410 can then have mounted partition 2 412b at /vol/partition_2/ within a file system of node 410. Jail 416 can make this mount point —/vol/partition_2/—appear to be the root directory ("/") within jail 416. By doing this, then scripts that are run within the jail that make absolute references to locations in the file system can refer to the intended locations of the file system, even though the operations are being performed on portions of partition 2 412b instead of partition 1 412a, which is the boot partition.

Patches 418 can comprise the one or more patches that are being installed on node 410, and within partition 2 412b. Patches 418 can be downloaded by node 410 from a patch store, such as patch store 212 of FIG. 2. Installing patches on node 410 can comprise running one or more scripts that makes an absolute reference to a location in the file system. Using the example of jail 416, by installing patches 418 within jail 416, the patches can be installed to partition 2 412b even though node is not booted from partition 2 412b, but from partition 1 412a.

Figure 5:
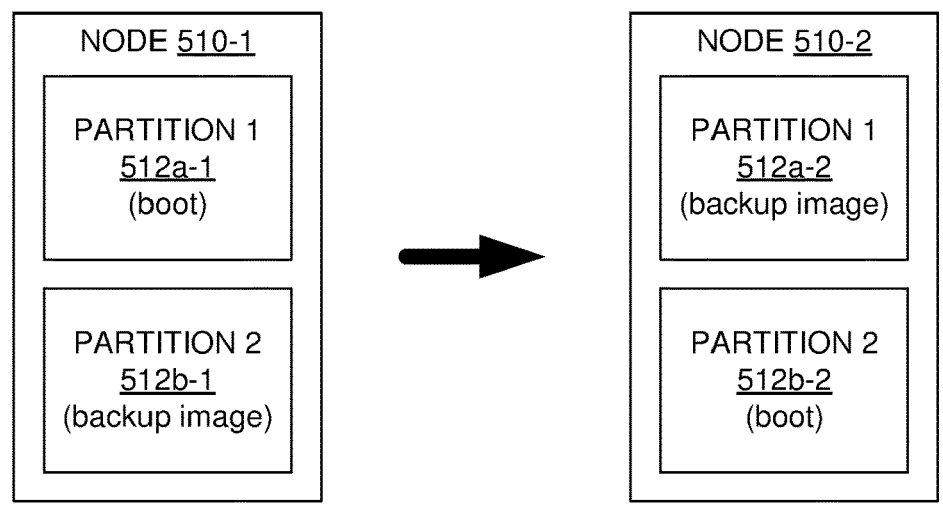
FIG. 5 illustrates a block diagram of an example computer system that can facilitate installing patches using a jail a second time, in accordance with certain embodiments of this disclosure.

FIG. 5 illustrates a block diagram of an example computer system 500 that can facilitate installing patches using a jail a second time, in accordance with certain embodiments of this disclosure. As depicted, computer system 500 comprises node 510-1 and node 510-2. In turn, node 510-1 comprises partition 1 512*a*-1 and partition 2 512*b*-1, and node 510-2 comprises partition 1 512*a*-2 and partition 2 512*b*-2. In some examples, node 510-1 and/or node 510-2 can implement aspects of the process flows of FIGS. 6-9 to facilitate installing patches using a jail. Node 510-1 and node 510-2 each can be implemented with aspects of one or more instances of computing environment 1000 of FIG. 10.

In some examples, node 510-1 and node 510-2 each can be similar to a node of nodes 110 of FIG. 1, to node 1 210*a* or node 2 210*b* of FIG. 2, or to node 310 of FIG. 3. In some examples, partition 1 512*a*-1, partition 1 512*a*-2, partition 2 512*b*-1, and partition 2 512*b*-2 each can be similar to partition 1 312*a* and/or partition 2 312*a* of FIG. 3, and/or partition 1 412*a* and/or partition 2 412*b* of FIG. 4.

In the example of FIG. 5, node 510-1 and node 510-2 can be the same computing node, at two different points in time, with node 510-1 representing the computing node at an earlier time than node 510-2. Likewise, partition 1 512*a*-1 and partition 1 512*a*-2 can be the same partition at two different points in time, and partition 2 512*b*-1 and partition 2 512*b*-2 can be the same partition at two different points in time.

At the earlier point in time of node 510-1, node 510-1 has booted from partition 1 512*a*-1. When node 510-1 performs installing patches using a jail, that can be performed on partition 2 512*b*-1. Once the installation is complete, the node can reboot from partition 2 512*b*-1.

So, at the later point in time of node 510-2, node 510-2 has booted from partition 2 512*b*-2. Then, when node 510-2 performs installing patches using a jail, that can be performed on partition 1 512*a*-2. Once the installation is complete on node 510-2, the node can reboot from partition 1 512*a*-2. In this manner, each time installing patches using a jail is performed, the boot partition and the partition upon which the new operating system and patches are installed is switched, and this switch can occur again each time installing patches using a jail is performed.

Example Process Flows

Figure 6:
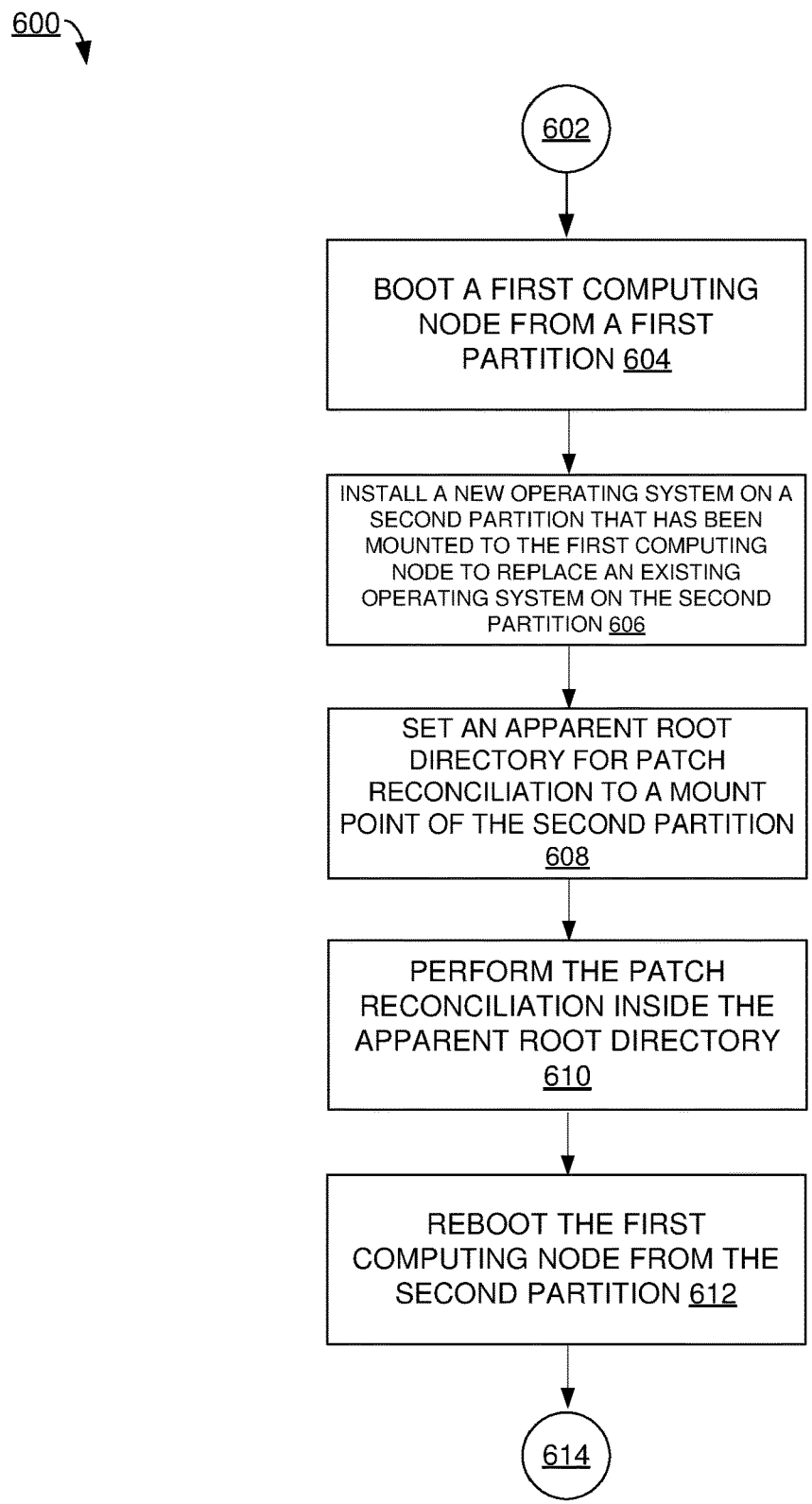
FIG. 6 illustrates an example process flow that can facilitate installing patches using a jail, in accordance with certain embodiments of this disclosure.

FIG. 6 illustrates an example process flow that can facilitate installing patches using a jail, in accordance with certain embodiments of this disclosure. In some examples, aspects of process flow 600 can be implemented by computing cluster 106 of FIG. 1; computing cluster 206 of FIG. 2; node 310 of FIG. 3; node 410 of FIG. 4; and/or node 510-1 and/or node 510-2 of FIG. 5. It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 700 of FIG. 7, process flow 800 of FIG. 8, and process flow 900 of FIG. 9.

Process flow 600 begins with 602, and moves to operation 604. Operation 604 depicts booting a first computing node from a first partition. Booting a computing node from a partition can comprise the computing node executing an operating system that is stored on the partition.

In some examples, the first computing node comprises at least two partitions, which includes a first partition and a second partition. The first partition can comprise a boot partition at this point in time, because the first computing node booted from this first partition.

The second partition can comprise a backup firmware image partition, which stores a known configuration for the computing node that can be booted from, such in the case where the first partition becomes corrupted. Put another way, the backup firmware image partition can comprise a file system partition that contains a known valid operating system configuration for the first computing node, and/or the backup firmware image partition can comprise a file system partition that is booted from in response to the first computing node failing to boot from the first partition.

After operation 604, process flow 600 moves to operation 606.

Operation 606 depicts, after the booting, installing a new operating system on a second partition that has been mounted to the first computing node to replace an existing operating system on the second partition. In some examples, operation 606 can be implemented in a similar manner as process flow 700 of FIG. 7.

In some examples, the combination of operation 604 and operation 606 comprises installing a new operating system on a second partition that has been mounted to a first computing node that is booted from a first partition, to replace an existing operating system on the second partition.

In some examples, the combination of operation 604 and operation 606 comprises installing a new operating system on a second partition that is mounted for a first computing node that is booted from a first partition.

After operation 606, process flow 600 moves to operation 608.

Operation 608 depicts setting an apparent root directory for patch installation to a mount point of the second partition. In some examples, operation 608 (and operation 610) can be implemented in a similar manner as process flow 800 of FIG. 8.

In some examples, operation 608 comprises creating a jail for patch installation to the second partition.

After operation 608, process flow 600 moves to operation 610.

Operation 610 depicts, after the setting, performing the patch installation inside the apparent root directory. In some examples, operation 610 (and operation 608) can be implemented in a similar manner as process flow 800 of FIG. 8.

In some examples, operation 610 comprises performing the patch installation inside the jail.

After operation 610, process flow 600 moves to operation 612.

Operation 612 depicts rebooting the first computing node from the second partition.

In some examples, operation 612 comprises booting the first computing node from the new operating system on the second partition as patched by one or more patches from the performing the patch installation. That is, rebooting from the second partition involves booting the first computing node into the new operating system that is stored on the second partition.

In some examples, operation 612 comprises setting a configuration of the first computing node to indicate that the first computing node will boot from the second partition when the first computing node reboots. That is, the first computing node can have a setting (such as a Basic Input/Output System (BIOS) setting) that indicates which partition to boot from when the first computing node boots up. This setting can be set to indicate that the next boot of the first computing node is to be made from the second partition, as opposed to from the first partition.

After operation 612, process flow 600 moves to 614, where process flow 600 ends.

Figure 7:
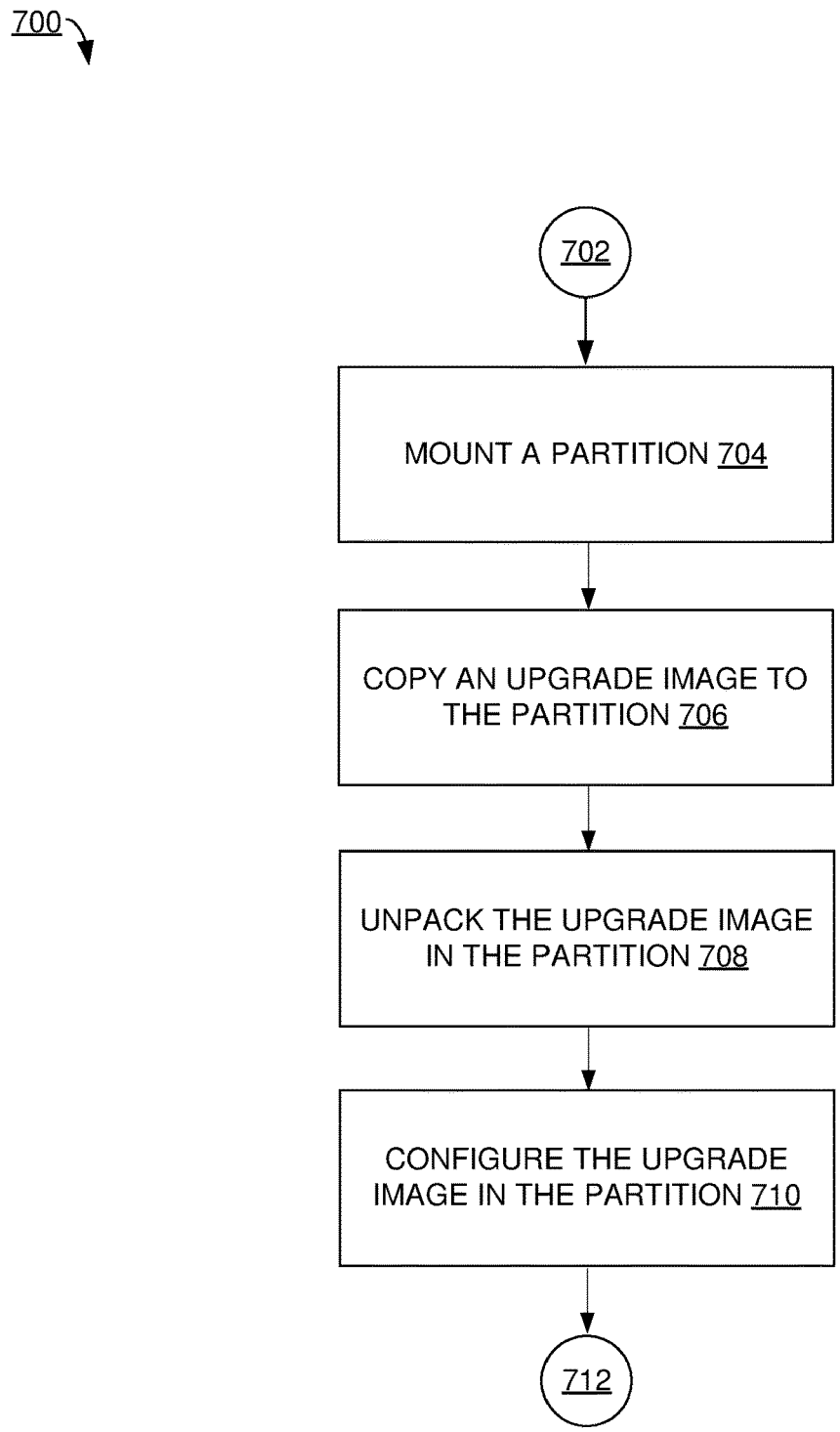
FIG. 7 illustrates an example process flow that can facilitate installing an operating system as part of installing patches using a jail, in accordance with certain embodiments of this disclosure.

FIG. 7 illustrates an example process flow that can facilitate installing an operating system as part of installing patches using a jail, in accordance with certain embodiments of this disclosure. In some examples, aspects of process flow 700 can be implemented by computing cluster 106 of FIG. 1; computing cluster 206 of FIG. 2; node 310 of FIG. 3; node 410 of FIG. 4; and/or node 510-1 and/or node 510-2 of FIG. 5. It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of one or more of process flow 600 of FIG. 6, process flow 800 of FIG. 8, and process flow 900 of FIG. 9.

Process flow 700 begins with 702, and moves to operation 704. Operation 704 depicts mounting a partition. In some examples, this partition that is mounted can be the second partition of process flow 600 of FIG. 6. Mounting a partition generally can comprise making a file or storage of the partition accessible to a computing node at a known location within a file system of the computing node.

After operation 704, process flow 700 moves to operation 706.

Operation 706 depicts copying an upgrade image to the partition. In some examples, the upgrade image is stored on a computing cluster and outside of the partition (e.g., computing cluster 106 of FIG. 1) and is copied from that location to a computer storage location that corresponds to the partition.

After operation 706, process flow 700 moves to operation 708.

Operation 708 depicts unpacking the upgrade image in the partition. In some examples where it is a second partition that is being upgraded, operation 708 comprises unpacking an upgrade image that comprises the new operating system in the second partition. The upgrade image can be packed because it is compressed according to a known compression technique. In such examples, unpacking the upgrade image can then comprise decompressing the upgrade image based on the known compression technique that was used to pack the upgrade image.

After operation 708, process flow 700 moves to operation 710.

Operation 710 depicts configuring the upgrade image in the partition. Configuring the upgrade image can comprise creating, copying, or otherwise modifying one or more files corresponding to an operating system such that, after installing the upgrade image, the partition will contain a new operating system, or a new version of an operating system. In some examples, this can comprise copying and modifying configuration files from running partition (e.g., partition 1 512a-1 of FIG. 5) to the new backup firmware partition (e.g., partition 2 512b-1 of FIG. 5).

After operation 710, process flow 700 moves to 712, where process flow 700 ends.

Figure 8:
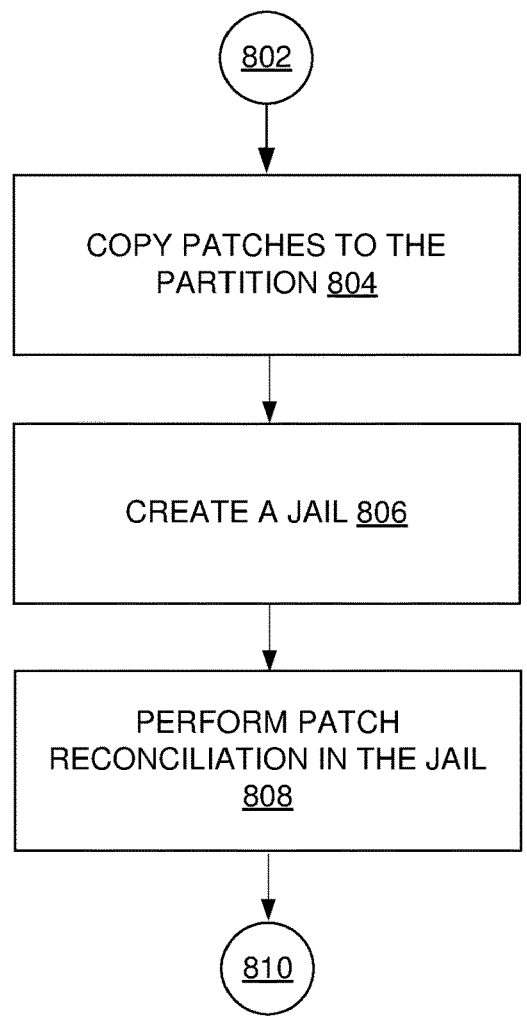
FIG. 8 illustrates another example process flow that can facilitate installing patches using a jail, in accordance with certain embodiments of this disclosure.

FIG. 8 illustrates another example process flow that can facilitate installing patches using a jail, in accordance with certain embodiments of this disclosure. In some examples, aspects of process flow 800 can be implemented by computing cluster 106 of FIG. 1; computing cluster 206 of FIG. 2; node 310 of FIG. 3; node 410 of FIG. 4; and/or node 510-1 and/or node 510-2 of FIG. 5. It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 600 of FIG. 6, process flow 700 of FIG. 7, and process flow 900 of FIG. 9.

Process flow 800 begins with 802, and moves to operation 804. Operation 804 depicts copying patches to the partition. In some examples, this partition of operation 804 can be the partition of process flow 700 of FIG. 7, and/or the second partition of process flow 600 of FIG. 6.

After operation 804, process flow 800 moves to operation 806.

Operation 806 depicts creating a jail. In some examples, creating a jail can comprise setting the apparent root directory for patch installation to the mount point of the partition. In some examples, creating a jail can comprise creating a jail with the mount point of the partition as the root partition in the jail. In some examples, creating a jail can comprise copying or linking at least one system file to the apparent root directory. In some examples, creating a jail can comprise changing a root directory for an environment used for patch installation.

After operation 804, process flow 800 moves to operation 808.

Operation 808 depicts performing patch installation in the jail. In some examples, performing patch installation can comprise executing a first patch script in association with installing a first patch, the first patch script referencing the apparent root directory. In some examples, the first patch script referencing the apparent root directory comprises the first patch script making an absolute reference to a file system location of a mounted partition. The patches can be accompanied by patch scripts that are executed to install the patches. A patch script can make absolute file system references that might not work if the patch script is being run on a mounted partition instead of on a boot partition. By creating a jail that changes a mount point of the partition being upgraded to the apparent root directory, a patch script that makes absolute file system references can correctly execute on this mounted partition.

In some examples where a second partition is being upgraded, patch installation can comprise installing at least a first patch for the new operating system in the second partition.

In some examples, patch installation can comprise evaluating one or more previously-installed patches for the partition being upgraded; determining a missing patch based on the one or more previously-installed patches for this partition and a registered patch for the first computing node; and determining at least one operation to perform to apply the missing patch to the second partition. That is, patch installation can comprise determining what needs to be done to modify a state of the partition being upgraded from its current state to a state where the identified patches are installed, and then performing these operations.

After operation 808, process flow 800 moves to 810, where process flow 800 ends.

Figure 9:
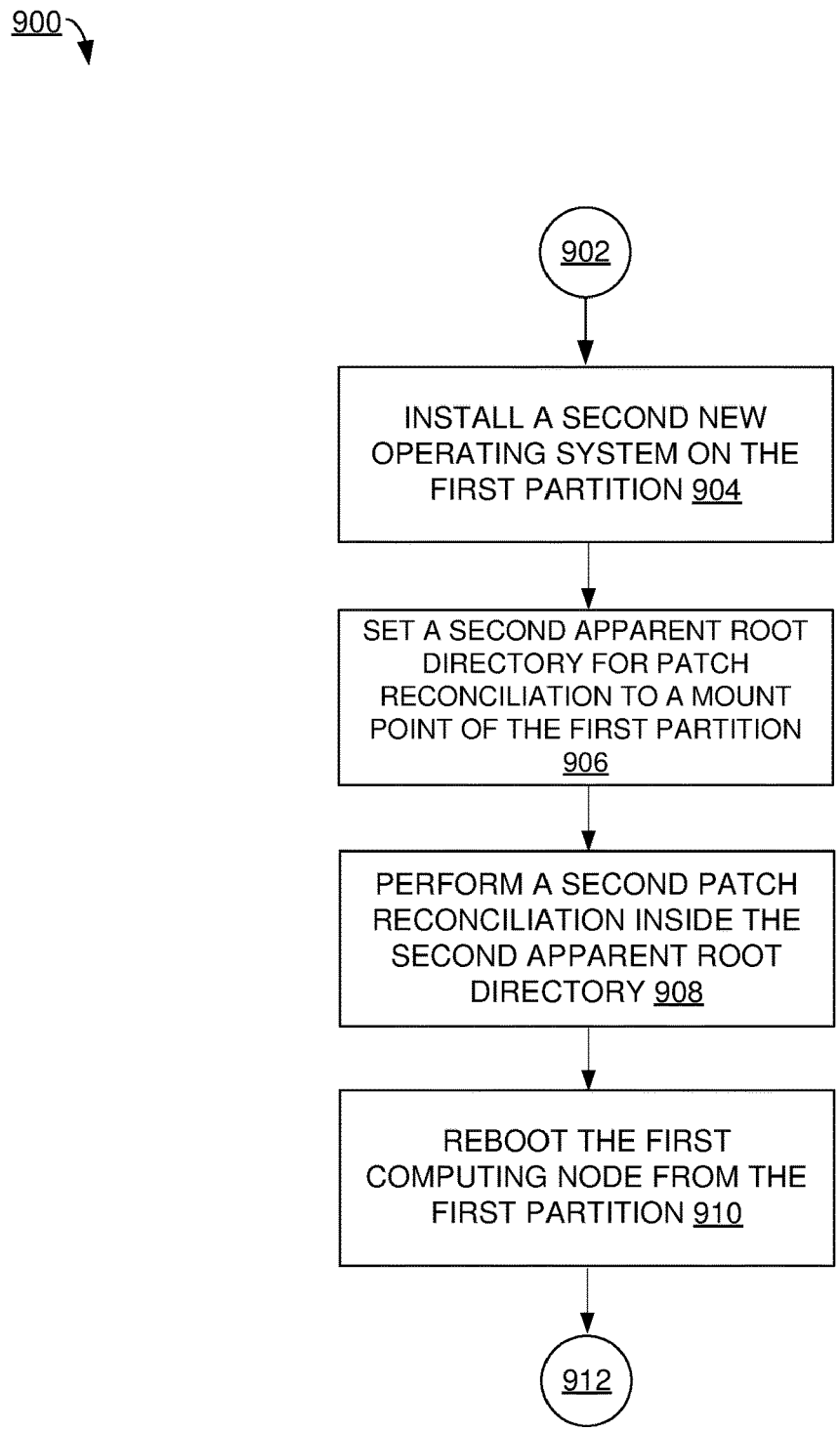
FIG. 9 illustrates an example process flow that can facilitate performing a second upgrade as part of installing patches using a jail, in accordance with certain embodiments of this disclosure.

FIG. 9 illustrates an example process flow that can facilitate performing a second upgrade as part of installing patches using a jail, in accordance with certain embodiments of this disclosure. In some examples, aspects of process flow 900 can be implemented by computing cluster 106 of FIG. 1; computing cluster 206 of FIG. 2; node 310 of FIG. 3; node 410 of FIG. 4; and/or node 510-1 and/or node 510-2 of FIG. 5. It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 600 of FIG. 6, process flow 700 of FIG. 7, and process flow 800 of FIG. 8.

Process flow 900 to can be implemented to perform another upgrade with patches after process flow 600 of FIG. 6 has been implemented to perform a first upgrade with patches. That is, in process flow 600, the first partition begins as the boot partition, and the second partition begins as the upgrade partition (or backup firmware image partition). After the second partition is upgraded, the computing node is booted from the second partition, which is now the boot partition (switching the first partition over to being the upgrade partition). Here in process flow 900, which operation is performed on which partition can be switched, corresponding to how which partition is the boot partition is switched.

In process flow 900, the second partition begins as the boot partition, and the first partition begins as the upgrade partition. After the first partition is upgraded, the computing node can be rebooted from the first partition, and the roles of the nodes (boot v. upgrade) can be switched again. In this manner, subsequent upgrades can alternate between being implemented by process flow 600 of FIG. 6 and process flow 900, as upgrades are performed and the boot partition is switched.

Process flow 900 begins with 902, and moves to operation 904. Operation 904 depicts installing a second new operating system on the first partition. In some examples, operation 904 can be implemented in a similar manner as operation 606 of FIG. 6.

After operation 904, process flow 900 moves to operation 906. Operation 906 depicts setting a second apparent root directory for patch installation to a mount point of the first partition. In some examples, operation 906 can be implemented in a similar manner as operation 608 of FIG. 6.

After operation 906, process flow 900 moves to operation 908. Operation 908 depicts performing a second patch installation inside the second apparent root directory. In some examples, operation 908 can be implemented in a similar manner as operation 610 of FIG. 6.

After operation 908, process flow 900 moves to operation 910. Operation 910 depicts rebooting the first computing node from the first partition. In some examples, operation 910 can be implemented in a similar manner as operation 612 of FIG. 6.

After operation 910, process flow 900 moves to 912, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented. For example, aspects of computing environment 1000 can be used to implement aspects of remote computer 102 and/or computing cluster 106 of FIG. 1; computing cluster 206, node 1 210a, and/or node 2 210b of FIG. 2; node 310 of FIG. 3; node 410 of FIG. 4; and/or node 510-1 and/or node 510-2 of FIG. 5. In some examples, computing environment 1000 can implement aspects of the process flows of FIGS. 6-9 to facilitate installing patches using a jail.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
booting a first computing node from a first partition;
after the booting, installing a new operating system on a second partition that has been mounted to the first computing node at a first location within a file system of the first computing node to replace an existing operating system on the second partition;
setting an apparent root directory for patch installation to a mount point of the second partition, wherein the apparent root directory is a second location within the file system that differs from the first location, and wherein the second partition remains mounted to the first computing node while the apparent root directory is presented to a patch that is subject to patch installation;
after the setting, performing the patch installation inside the apparent root directory; and
rebooting the first computing node from the second partition.

2. The system of claim 1, wherein the new operating system is a first new operating system, wherein the apparent root directory for the patch installation is a first apparent root directory for first patch installation, and wherein the operations further comprise:
installing a second new operating system on the first partition;
setting a second apparent root directory for patch installation to a mount point of the first partition;
performing a second patch installation inside the second apparent root directory; and
rebooting the first computing node from the first partition.

3. The system of claim 1, wherein the setting the apparent root directory for patch installation to the mount point of the second partition comprises:
creating a jail with the mount point of the second partition as the apparent root directory in the jail.

4. The system of claim 1, wherein the setting the apparent root directory for patch installation to the mount point of the second partition comprises:
copying or linking at least one system file to the apparent root directory.

5. The system of claim 1, wherein the setting the apparent root directory for patch installation to the mount point of the second partition comprises:
changing a root directory for an environment used for patch installation.

6. The system of claim 1, wherein the performing the patch installation inside the apparent root directory comprises:
executing a first patch script in association with installing a first patch, the first patch script referencing the apparent root directory.

7. The system of claim 6, wherein the first patch script referencing the apparent root directory comprises the first patch script making an absolute reference to a file system location of the second partition.

8. A method, comprising:
installing, by a system comprising a processor, a new operating system on a second partition that has been mounted to a first location within a file system of a first partition of a first computing node that is booted from the first partition, to replace an existing operating system on the second partition;
creating, by the system, a jail for patch installation to the second partition, wherein the jail comprises a second location within the file system of the first partition that differs from the first location, and wherein the second partition remains mounted to the first computing node while the second location is presented as a root directory to a patch for which patch installation is performed;

performing, by the system, the patch installation inside the jail; and rebooting, by the system, the first computing node from the second partition.

9. The method of claim 8, wherein the performing the patch installation inside the jail comprises:

installing, by the system, at least a first patch for the new operating system in the second partition.

10. The method of claim 8, wherein the performing the patch installation inside the jail comprises:

evaluating, by the system, one or more previously-installed patches for the second partition;

determining, by the system, a missing patch based on the one or more previously-installed patches for the second partition and a registered patch for the first computing node; and determining, by the system, at least one operation to perform to apply the missing patch to the second partition.

11. The method of claim 8, wherein the rebooting the first computing node from the second partition comprises:

booting, by the system, the first computing node from the new operating system on the second partition as patched by one or more patches from the performing the patch installation.

12. The method of claim 8, wherein the installing the new operating system on the second partition comprises:

unpacking, by the system, an upgrade image that comprises the new operating system in the second partition.

13. The method of claim 8, wherein the rebooting the first computing node from the second partition comprises:

setting, by the system, a configuration of the first computing node to indicate that the first computing node will boot from the second partition when the first computing node reboots.

14. The method of claim 8, wherein the new operating system is a first new operating system, and further comprising:

installing, by the system, a second new operating system on the first partition;

creating, by the system, a second jail for patch installation to the first partition;

performing, by the system, a second patch installation inside the second jail; and rebooting, by the system, the first computing node from the first partition.

15. A non-transitory computer-readable medium comprising instructions that, in response to execution, cause a system comprising a processor to perform operations, comprising:

installing a new operating system on a second partition that is mounted to a first location within a file system of a first partition of a first computing node that is booted from the first partition;

creating a jail for patch installation to the second partition, wherein the jail comprises a second location within the file system of the first partition that differs from the first location, and wherein the second partition remains mounted to the first computing node while the second location is presented as a root directory to a patch for which patch installation is performed;

performing the patch installation inside the jail; and rebooting the first computing node from the second partition.

16. The non-transitory computer-readable medium of claim 15, wherein the first partition comprises a boot partition.

17. The non-transitory computer-readable medium of claim 15, wherein the second partition comprises a backup firmware image partition.

18. The non-transitory computer-readable medium of claim 17, wherein the backup firmware image partition comprises a file system partition that contains a known valid operating system configuration for the first computing node.

19. The non-transitory computer-readable medium of claim 17, wherein the backup firmware image partition comprises a file system partition that is booted from in response to the first computing node failing to boot from the first partition.

20. The non-transitory computer-readable medium of claim 15, wherein the new operating system is a first new operating system, and wherein the operations further comprise:

installing a second new operating system on the first partition;

performing a second patch installation inside a second jail of the first partition; and rebooting the first computing node from the first partition.

* * * * *